(12) United States Patent
Harvey, IV et al.

(10) Patent No.: US 8,255,503 B2
(45) Date of Patent: Aug. 28, 2012

(54) METHOD AND APPARATUS FOR COMMUNICATING TEXT-BASED COMMANDS THROUGH A NETWORK

(75) Inventors: Arthur Edwin Harvey, IV, El Dorado Hills, CA (US); Christy Harvey, legal representative, Seattle, WA (US); Arthur Landers Hager, III, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2403 days.

(21) Appl. No.: 11/033,244

(22) Filed: Jan. 11, 2005

(65) Prior Publication Data

US 2006/0168242 A1 Jul. 27, 2006

(51) Int. Cl.
*G06F 15/173* (2006.01)

(52) U.S. Cl. .................. 709/223; 709/220; 709/227
(58) Field of Classification Search .............. 709/220, 709/223, 227
See application file for complete search history.

(56) References Cited

U.S. PATENT DOCUMENTS

2006/0036723 A1* 2/2006 Yip et al. ................... 709/223
* cited by examiner

*Primary Examiner* — Derrick Ferris
*Assistant Examiner* — Farhad Ali

(57) ABSTRACT

A network device having text-based command language functions that are accessible via the network, includes a receiver for receiving a network protocol command sent through the network and having a text-based command attached thereto. The receiver determines whether a text-based command is attached to the network protocol command, and an interface extracts the text-based command from the network protocol command.

21 Claims, 5 Drawing Sheets

METHOD AND APPARATUS FOR COMMUNICATING TEXT-BASED COMMANDS THROUGH A NETWORK

BACKGROUND OF THE INVENTION

A typical network environment such as a local area network (LAN), a wide area network (WAN), or the Internet includes a number of network devices such as servers, switches, routers, hubs, firewalls, load balancers, and storage devices and controllers. A number of user devices and at least one network management device are connected to, the network and in communication with the network devices. Generally, network devices are accessible to user devices or a network management device through network protocols such as a simple network management protocol (SNMP). Known network protocol commands such as SNMP commands have limited capabilities, and are used generally for sending and receiving specific information relating to predefined functions of a particular network device.

Network devices contain internal state information or management information such as, for example, port status and VLAN configurations, that is of interest to a user for debugging or trouble shooting, for example. To access the network devices for this type of information, the user typically has to interface with the network device generally through text-based command language such as a command line interface (CLI), which is considered to be much more user friendly and offers more capabilities than an SNMP interface. A connection to the network device typically requires connecting a communication cable directly to the network device from a portable device such as a laptop PC locally at the network device.

SUMMARY OF THE INVENTION

The present invention relates to a network device having text-based command language functions that are accessible via the network. The network device includes a receiver for receiving a network protocol command sent through the network and having a text-based command attached thereto. The receiver determines whether a text-based command is attached to the network protocol command, and an interface extracts the text-based command from the network protocol command.

DETAILED DESCRIPTION

Broadly stated, the present invention is directed to apparatus and methods for communicating text-based commands such as CLI commands through a network. Text-based commands are added onto network protocol commands such as SNMP at a client device, which may be a user device or a network management device and transmitted over the network to the target network device, where the text-based commands are extracted and processed by a processor. Messages resulting from the process performed in accordance with text-based commands are added onto a network protocol reply messages such as SNMP, and then transmitted back to the client through the network. In this manner, the user is enabled to remotely access the functions of the network devices which may otherwise be unavailable using the network protocol commands typically used in network communication.

Figure 1:
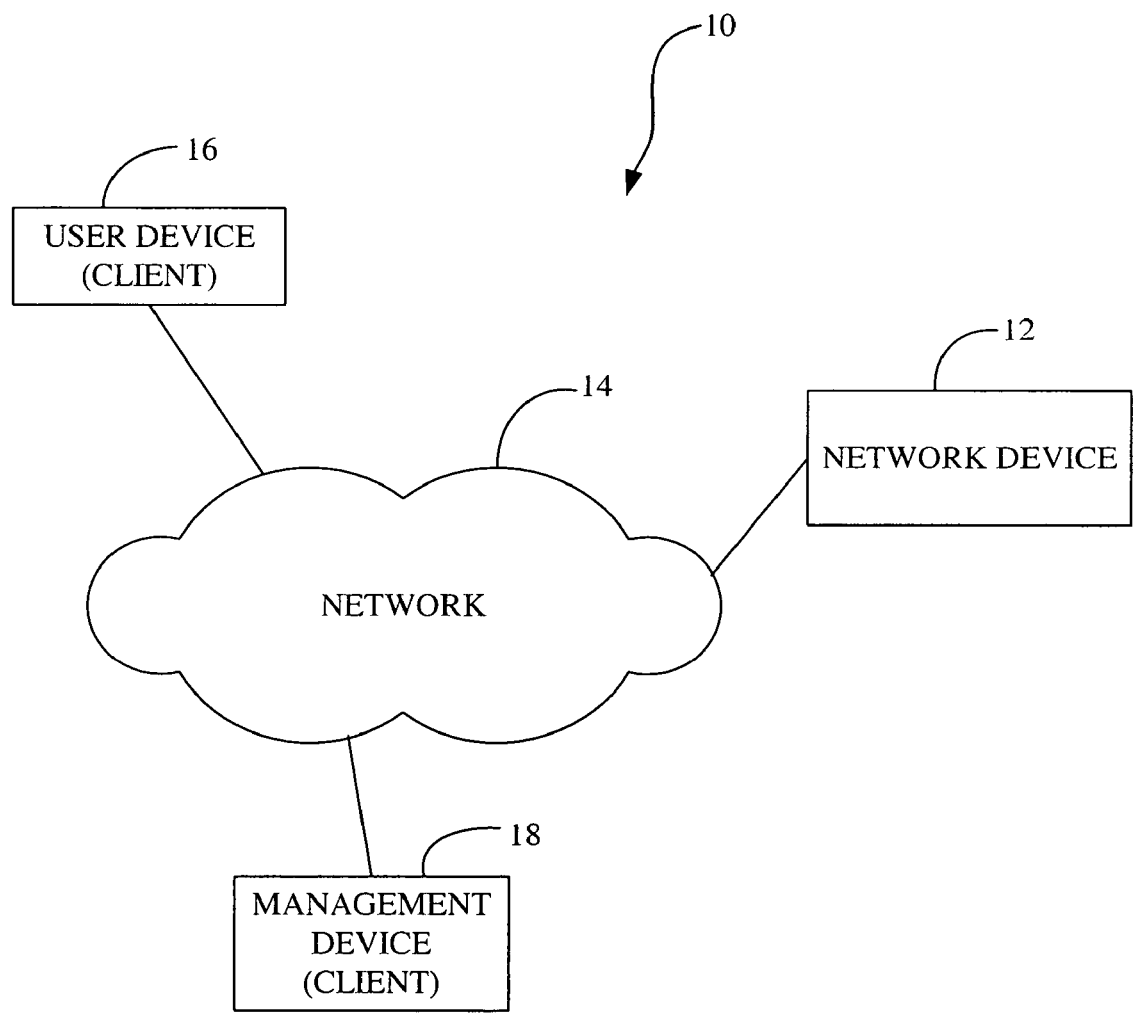
FIG. 1 is a diagram illustrating a network environment in which the present invention is implemented.

Turning now to FIG. 1, a network environment 10 in which the present invention is directed includes a plurality of network devices 12 (one separately shown) defining a network 14. A plurality of user devices 16 (one shown) and at least one management device 18 are in communication with the network 14. The user devices 16 and the management device 18 are capable of communicating with any of the network devices 12 using a simple network management protocol (SNMP) or other network protocols such as XML, Telnet or SSH, for example. The user devices 16 may be a computer or any other computing devices, and the management device 18 may be a server or a stand-alone dedicated device for controlling the management of network devices 12. Access to any of the network devices 12 by a user may be carried out through either the user devices 16 or the management device 18, which are "clients" of the network devices.

Figure 2:
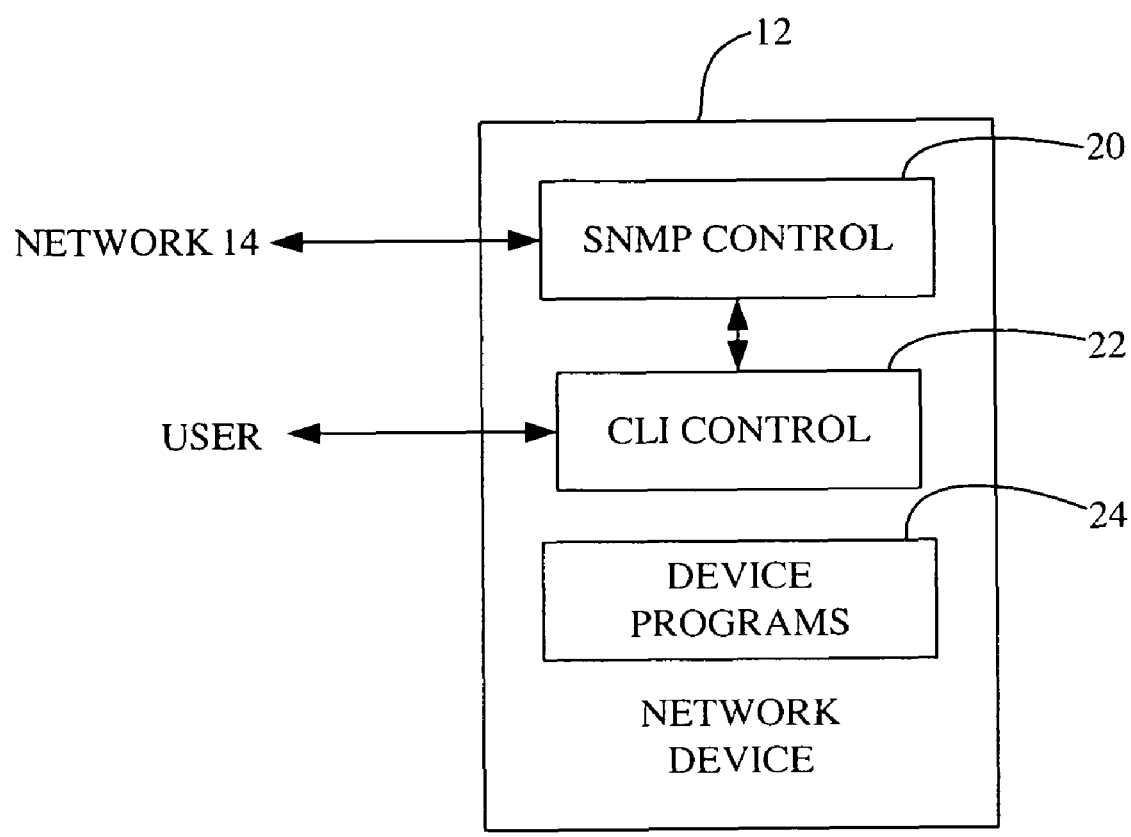
FIG. 2 is a block diagram showing the components of a network device in accordance with one embodiment of the present invention.

Referring to FIG. 2 and in accordance with one embodiment of the present invention, the network device 12 includes an SNMP control 20, a CLI control 22 and device programs 24. The SNMP control 20 is configured and adapted to be in communication with the network 14, and accordingly, to the user devices 16 and the management device 18, i.e., the clients, that are connected to the network. More specifically, the SNMP control 20 receives SNMP commands from, and sends SNMP replies back to, the clients in the network 14. SNMP commands may include instructions to the network devices 12 for performing predefined functions. They may also carry text-based commands such as CLI commands as in one embodiment of the present invention for requesting internal information of the network devices 12.

The CLI control 22 is configured and adapted to be in communication with the SNMP control 20. It is also configured to interface directly with a user device such as a PC or other processors having at least a keyboard or a monitor, and not through the network 14. Thus, the CLI control 22 allows the user to locally access the internal or management information of the network device 12, and also enables the user to access the same information through the network 14 via the SNMP control 20.

The network device 12 also includes device programs 24 that enable the network device to perform various functions particular to the network device. For example, if the network device were a switch, the device program 24 would perform functions such as configuring VLANs, traffic management and routing data. These device programs 24 may be enabled through corresponding software or firmware installed in the network device 12.

Figure 3:
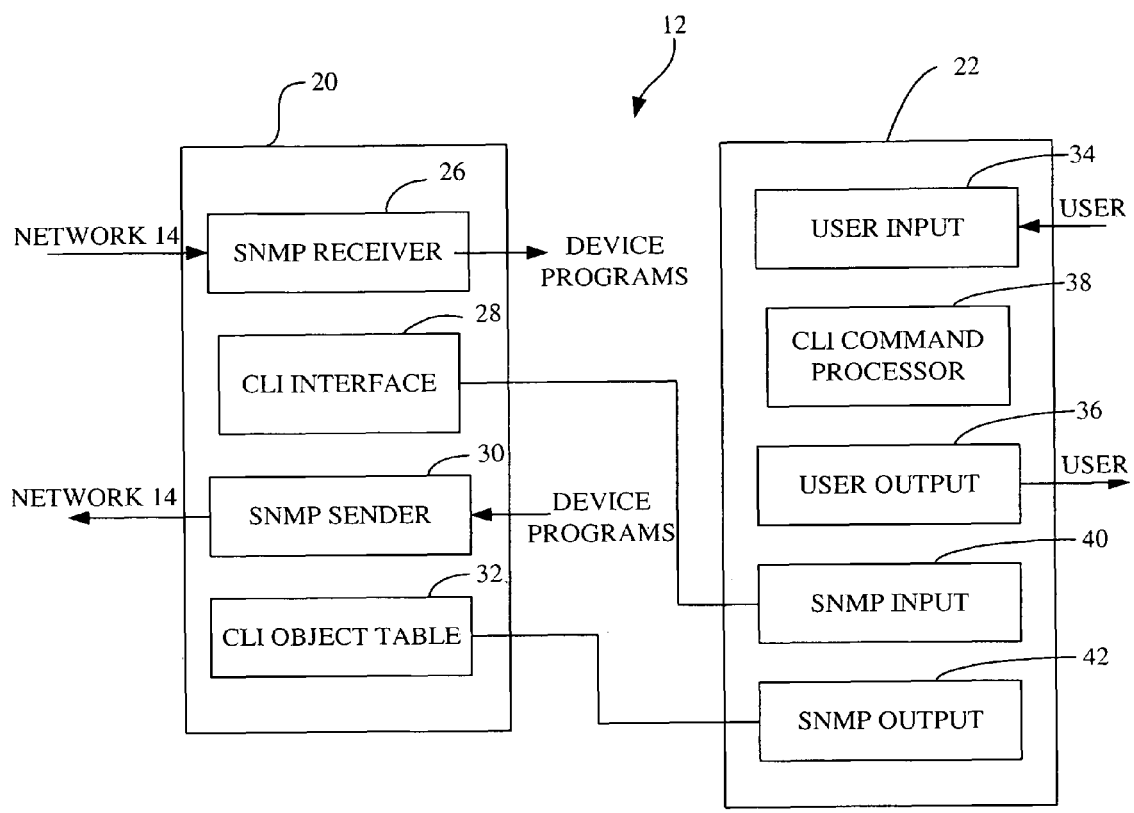
FIG. 3 is a block diagram showing the components of a SNMP control block and a CLI control block of the network device shown in FIG. 2.

Turning now to FIG. 3, the SNMP control 20 includes an SNMP receiver 26, a CLI interface 28, an SNMP sender 30 and a CLI object table 32. The SNMP receiver 26 is configured to receive SNMP commands messages from the network 14, which may carry a CLI command. The CLI interface 28 extracts the CLI command from the SNMP command, if included, and forwards it to the CLI control 22. The CLI object table 32 stores information from the CLI control 22 resulting from the functions performed or attempted in accordance with instructions contained in CLI commands received from the client through SNMP commands. The SNMP sender 30 sends information from the CLI object table 32 back to the client via the network 14 using an SNMP reply message.

The CLI control 22 includes a user input 34 for receiving CLI commands from a user input/output device (not shown) which is directly and locally connected to the network device 12, and not through the network 14. A user output 36 sends information to the user input/output device that is directly connected to the network device 12. A CLI command processor 38 processes any CLI commands received through the user input 34 or from the network 14, via the SNMP control 20. The CLI control 22 also includes an SNMP input 40 for receiving CLI commands from the CLI interface 28, and forwarding them to the CLI command processor 38. An SNMP output 42 receives messages from the CLI command processor 38 relating to the functions that it was instructed to perform and sends them to the CLI object table 32 of the SNMP control 20. It should be understood that while the SNMP control 20 and the CLI control 22 have been described above using SNMP commands and CLI commands, other network protocols such as XML, Telnet or SSH, for example may also be employed in the place of SNMP. Likewise, other text-based command language may also be incorporated into SNMP commands for transmission to the network devices 12 through the network 14.

Figure 4:
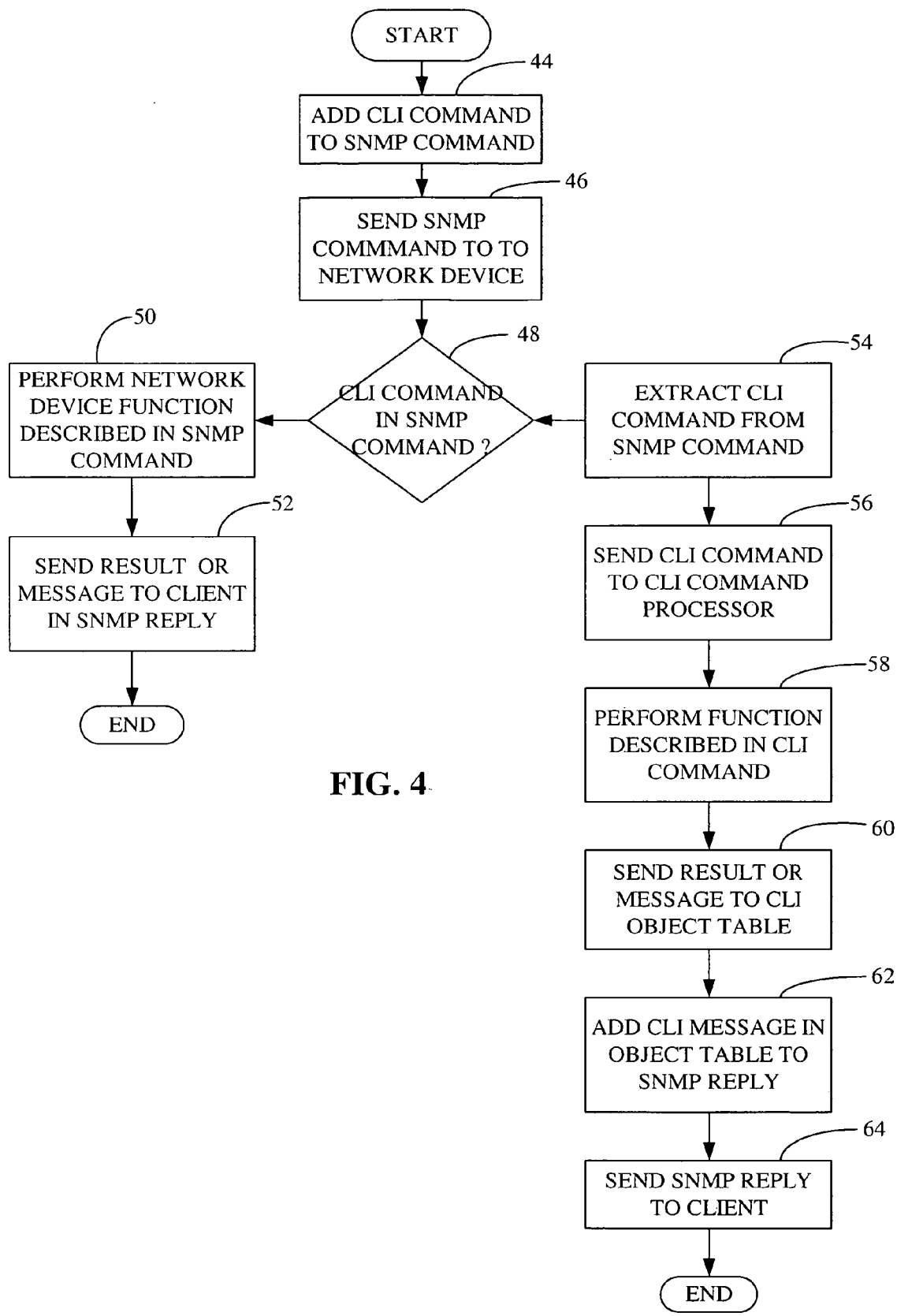
FIG. 4 is a flowchart describing a process for sending and receiving CLI commands to and reply from a network device through the network according to one embodiment of the present invention.
Figure 5:
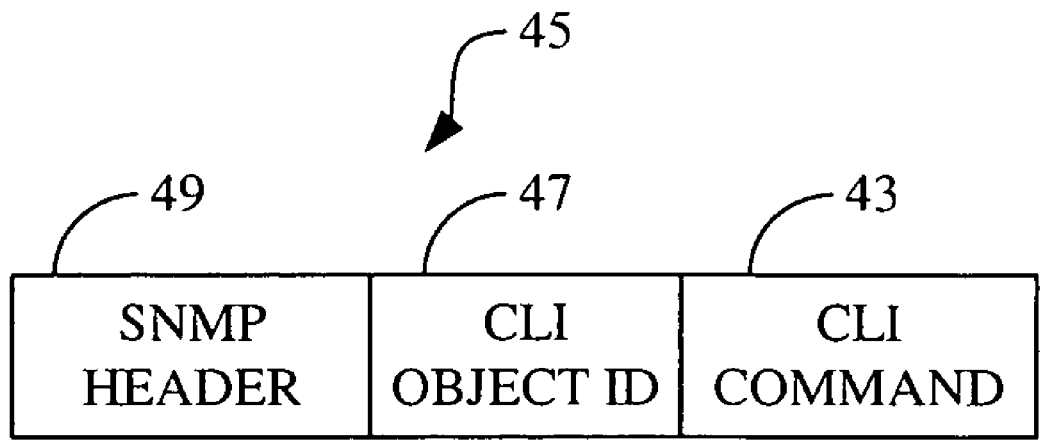
FIG. 5 is a diagram of an SNMP command including a CLI command.

Referring now to FIGS. 4 and 5, a CLI command 43 is transmitted to a target network device 12 via the network 14 by attaching it to an SNMP command 45. A CLI object identifier (ID) 47 is also attached to the same SNMP command following an SNMP header 49, indicating that a CLI command has been added (block 44). Those skilled in the art will recognize that attaching of the CLI object (ID) 47 and the CLI command 43 to an SNMP command or other network protocols, is within the existing capabilities of these network protocols, and that a user will be able to attach any text-based commands onto a network protocol without undue experimentation.

Once the CLI command 45 has been added, the SNMP command 45 is transmitted to the select network device 12 via the network 14 from the client, i.e., the user device 16 or the management device 18 (block 46). When the SNMP command 45 arrives at the target network device 12, the SNMP receiver 26 (shown in FIG. 3) determines whether a CLI command 43 is attached to the SNMP command 45 from the CLI command ID 47 (if the object ID is included in the SNMP command) (block 48). If the SNMP receiver 26 determines that a CLI command has not been added to the SNMP command 45, it forwards the command to the appropriate device programs (shown in FIG. 2), which performs the function described in the SNMP command (block 50). The results of the function performed or attempted (e.g., enabling ports, rebooting switches, loading configuration files, generating error messages) based the described command, is issued from the device program 24 to the SNMP sender 30, where the message or the result is sent in an SNMP reply back to the client 16 or 18 that issued the SNMP command 45 (block 52).

If the SNMP command 43 received from the client includes a CLI command 43 (block 48), the CLI interface 28 extracts the CLI command from the SNMP command (block 54). The CLI command 45 is then forwarded to the SNMP input 40 in the CLI control 22, and then to the CLI command processor 38 (block 56), where the function described in the CLI command is performed or attempted (block 58). The CLI command processor 38 also generates a message resulting from performing or attempting to carry out the function (e.g., status of network device 12, specific data requested in the CLI command or if the CLI command processor is busy, a message indicating such) described in the CLI command and sends it to the CLI object table 32 in the SNMP control 20 via the SNMP output 42 (block 60). The message in the CLI object table 32 is then added to an SNMP reply 51 (block 62) and sent to the client via the network 14 by the SNMP sender 30 (block 64).

Figure 6:
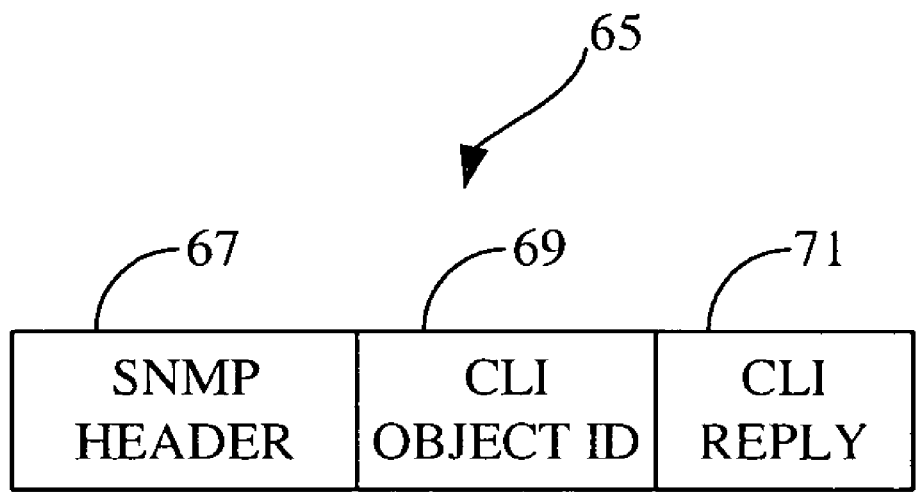
FIG. 6 is a diagram of an SNMP reply including a CLI reply.

An example of an SNMP reply 51 generated by the SNMP sender 30 is shown in FIG. 6. As with the SNMP command 45, the SNMP reply 51 also includes at least an SNMP header 67, a CLI object (ID) 69 indicating that a CLI reply 71 is attached to the SNMP reply 65. As also with the SNMP command 45, the SNMP sender 30 may be readily programmed using existing software to attach a CLI object (ID) 69 and a CLI reply 71 to the SNMP reply 65 without undue experimentation. Those skilled in the art will recognize that the message generated by this CLI command processor 38 may be too big to be attached to a single SNMP reply, and that the message may be added to multiple SNMP replies.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the present invention are set forth in the appended claims

What is claimed is:

1. A network device having text-based command language functions that are accessible via the network, comprising:
    a network protocol controller in communication with the network for performing functions requested in a network protocol command;
    a text-based command controller in communication with said network protocol controller for performing the text-based command functions;
    a network protocol receiver provided in said network protocol controller for receiving said network protocol command sent through the network and determining whether a text-based command is attached to said network protocol command;
    a text-based command interface provided in said network protocol controller for extracting said text-based command from said network protocol command; and
    a text-based command processor provided in said text-based command controller for performing the function described in said text-based command extracted from said network protocol command.

2. The network device as defined in claim 1, further comprising a text-based command receiver provided in said text-based command controller for receiving said extracted text-based command from said text-based command interface and forwarding said text-based command to said text-based command processor.

3. The network device as defined in claim 2, further including a second text-based command receiver for receiving text-based commands locally input by a user input device.

4. The network device as defined in claim 2, further including a memory for storing text-based messages generated by said text-based command processor relating to said text-based command received through the network.

5. The network device as defined in claim 4 further including a first output for outputting said text-based message generated by said text-based command processor to said memory.

6. The network device as defined in claim 5, further including a sender for attaching said text-based message in said table to a network protocol reply recognized by the network and sending said network protocol reply to the network.

7. The network device as defined in claim 6, wherein said network protocol reply comprises an SNMP protocol and said text-based message comprises a CLI command.

8. The network device as defined in claim 1, wherein said network protocol command comprises an SNMP command and said text-based command comprises a CLI command.

9. The network device as defined in claim 1, further comprising at least one device program for performing at least one predefined function described in said network protocol command, when said text-based command is not attached to said network protocol command.

10. The network device as defined in claim 1, wherein said network protocol command includes an object identifier indicating that said network protocol command is attached to said transmission command and said network protocol receiver determines that said text base command is attached to said network protocol command based on said object identifier.

11. The network device as defined in claim 1, wherein said text-based command is attached to said network based protocol by a client device connected to the network.

12. A method for accessing text-based command language functions of a network device from a client device via a network, comprising:

attaching a text-based command to a network protocol command recognized by the network at the client device, and sending the network protocol command to the network device through the network, said network device including a network protocol controller in communication with the network for performing functions requested in a network protocol command, and a text-based command controller in communication with said network protocol controller for performing the text-based command functions;

receiving said network protocol command at the network device using a network protocol receiver provided in said network protocol controller for receiving said network protocol command sent through the network and determining whether said text-based command is attached to said network protocol command; and, extracting said text-based command from said network protocol command, and enabling a text-based command processor provided in said text-based command controller for performing the function described in said text-based command extracted from said network protocol command.

13. The method as defined in claim 12, wherein said extracted text-based command is forwarded from a text-based command interface provided in said network protocol controller for extracting said text-based command from said network protocol command to said text-based command processor.

14. The method as defined in claim 13, wherein text-based commands received locally from a user input device is received through a second input.

15. The method as defined in claim 13, further comprising attaching a text-based message generated by said text-based command processor relating to said text-based command to a network protocol reply having a protocol recognized by the network, and sending said network protocol reply to the client device via the network.

16. The method as defined in claim 15, further comprising storing said text-based message in a memory in the network device prior to attaching said text-based message to said network protocol reply.

17. The method as defined in claim 15, wherein said network protocol command and said network protocol reply comprises an SNMP, and said text-based command and said text-based message comprise CLI.

18. The method as defined in claim 12, wherein said network protocol command comprises an SNMP command and said text-based command comprises CLI command.

19. The method as defined in claim 12, further comprising attaching an object identifier in said network protocol command indicating that said text-based command is attached to said network protocol command.

20. An apparatus for accessing text-based functions via the network, comprising:

a client device connected to the network for attaching a text-based command to a network protocol command recognized by the network, and sending the network protocol command to the network device through the network; and, a network device connected to the network and having the text-based functions, said network device including, a network protocol controller in communication with the network for performing functions requested in a network protocol command;

a text-based command controller in communication with said network protocol controller for performing the text-based command functions;

a network protocol receiver provided in said network protocol controller for receiving the network protocol command sent by said client device, and determining whether said text-based command is attached to said network protocol command;

a text-based command interface provided in said network protocol controller for extracting said text-based command from said network protocol command; and a text-based command processor provided in said text-based command controller for performing the function described in said text-based command extracted from said network protocol command.

21. The apparatus as defined in claim 20 wherein said network protocol command comprises an SNMP command and said text-based command comprises a CLI command.

* * * * *

UNITED STATES PATENT AND TRADEMARK OFFICE
CERTIFICATE OF CORRECTION

PATENT NO. : 8,255,503 B2  
APPLICATION NO. : 11/033244  
DATED : August 28, 2012  
INVENTOR(S) : Arthur Edwin Harvey, IV deceased et al.

Page 1 of 1

It is certified that error appears in the above-identified patent and that said Letters Patent is hereby corrected as shown below:

On the Title Page, Item (75), Inventors, in column 1, line 1, after "IV," insert -- deceased, --.

Signed and Sealed this
Eighteenth Day of June, 2013

Teresa Stanek Rea
*Acting Director of the United States Patent and Trademark Office*